United States Patent
Lee et al.

(10) Patent No.: US 8,187,768 B2
(45) Date of Patent: May 29, 2012

(54) SEPARATING PLATE OF SOLID OXIDE FUEL CELL STACK

(75) Inventors: Tae-Hee Lee, Daejeon (KR); Young-Sung Yoo, Daejeon (KR); Jin-Hyeok Choi, Daejeon (KR)

(73) Assignee: Korea Electric Power Corporation, Gangnam-Gu (KR)

( * ) Notice: Subject to any disclaimer, the term of this patent is extended or adjusted under 35 U.S.C. 154(b) by 428 days.

(21) Appl. No.: 12/607,491

(22) Filed: Oct. 28, 2009

(65) Prior Publication Data
US 2011/0070519 A1 Mar. 24, 2011

(30) Foreign Application Priority Data
Sep. 21, 2009 (KR) .................. 10-2009-0088879

(51) Int. Cl.
*H01M 4/64* (2006.01)
*H01M 2/14* (2006.01)
*H01M 2/18* (2006.01)

(52) U.S. Cl. ........ 429/514; 429/518; 429/512; 429/513; 429/467

(58) Field of Classification Search .................. 429/518
See application file for complete search history.

(56) References Cited

U.S. PATENT DOCUMENTS

| | | | |
|---|---|---|---|
| 4,758,481 A * | 7/1988 | Fauvel | 429/458 |
| 4,997,726 A * | 3/1991 | Akiyama et al. | 429/458 |
| 5,342,706 A * | 8/1994 | Marianowski et al. | 429/460 |
| 5,503,945 A * | 4/1996 | Petri et al. | 429/508 |
| 5,858,567 A * | 1/1999 | Spear et al. | 429/413 |
| 5,863,671 A * | 1/1999 | Spear et al. | 429/413 |
| 7,005,209 B1 * | 2/2006 | Gaines et al. | 429/434 |
| 7,041,407 B2 * | 5/2006 | Yang et al. | 429/437 |
| 2004/0096726 A1 * | 5/2004 | Takahashi | 429/38 |
| 2005/0214625 A1 * | 9/2005 | Lee et al. | 429/38 |
| 2005/0221158 A1 * | 10/2005 | Yamauchi et al. | 429/38 |
| 2007/0105000 A1 * | 5/2007 | Chapman et al. | 429/38 |
| 2007/0154747 A1 * | 7/2007 | Darling et al. | 429/13 |

* cited by examiner

*Primary Examiner* — Krishnan S Menon
(74) *Attorney, Agent, or Firm* — McDermott Will & Emery LLP (57) ABSTRACT

The present invention relates to a separating plate of solid oxide fuel cell stack. The separating plate of solid oxide fuel cell stack includes a substrate, upper and lower micro channel plates and upper and lower sealing guides. The substrate includes a fuel inflow/outflow manifold and an air inflow/outflow manifold disposed opposing to each other in a diagonal direction, a fuel channel having a pair of horizontal channels and an inclined channel connecting ends of the horizontal channels so as to connect the fuel inflow/outflow manifold, and an air channel having a pair of vertical channels and an inclined channel connecting ends of the vertical channels so as to connect the air inflow/outflow manifold. The upper and lower micro channel plates are attached to upper and lower parts of the substrate and includes a plurality of micro channels so as to distribute uniformly fuel flowing in the fuel channel and air flowing in the air channel. The upper and lower sealing guides keep a constant gap with the upper and lower micro channel plates and are attached to the upper and lower parts of the substrate.

14 Claims, 10 Drawing Sheets

SEPARATING PLATE OF SOLID OXIDE FUEL CELL STACK

CROSS-REFERENCE TO RELATED APPLICATIONS

This application claims priority under 35 U.S.C. §119 to Korean Patent Application No. 2009-0088879, filed on Sep. 21, 2009 in the Korean Intellectual Property Office (KIPO), the contents of which are herein incorporated by reference in their entirety.

BACKGROUND OF THE INVENTION

1. Field of the Invention

The present invention relates to a separating plate of solid oxide fuel cell stack. More particularly, the present invention relates to a separating plate of solid oxide fuel cell stack having a substrate, a micro channel plate and a sealing guide.

2. Description of the Related Art

In general, a fuel cell is a kind of energy conversion device. Fuel and air are injected to an anode (a fuel electrode) and a cathode (an air electrode) respectively, and ion-conduction via electrolyte is processed with electrochemical reaction. With some condition according to the properties of the electrodes and electrolyte, a fuel cell produces electricity as long as it is supplied with fuel.

Such fuel cell is more effective than conventional generation method, and no pollutant is produced except water when hydrogen is used as fuel. According to the kind of used electrolyte, the operating temperature and characteristic may be diverse, so that various applications are possible in different fields.

In the fuel cell, solid oxide fuel cell (SOFC; Solid Oxide Fuel Cell) is also called as Ceramic Fuel Cell since most of the electrode and electrolyte components of the SOFC comprises ceramic. The solid oxide fuel cell (SOFC), which consists of ceramic as electrodes materials and electrolyte, is operated at high temperature of 600~1000° C., and could be driven with fuel as hydrogen, carbon monoxide, methane and so on. The SOFC is also developed for residential and distributed power generation systems since cogeneration and combined cycle in conjunction with gas turbine are easily applied. A research in conjunction with coal gas as a large power system is underway.

Since a voltage of one fuel cell is less than 1 volt, a stack should be made by deposing couple of cells in order to achieve the desired output in the solid oxide fuel cell (SOFC). In order to make a stack by laminating flat type solid oxide fuel cell (SOFC), a separating plate is needed for preventing two kinds of gas providing to the fuel electrode and the air electrode from mixing with each other. The separating plate provides an electronic connection between fuel cells as well as a channel for distributing the two kinds of provided gas in the stack.

As material of this separating plate, metal and ceramic material is widely used. The ceramic separating plate is hard to manufacture in a large scale, and has weak mechanical strength and bad mechanical workability for forming the channel. In addition, the ceramic separating plate has low thermal conductivity, so that the heat generated in the reaction of the fuel cell is difficult to disperse. In order to serve as the channel for a reaction gas supply, the ceramic separating plate should be sintered finely. However, a sintering temperature is too high to be sintered at high density.

In order to solve the problem of these ceramic separating plates, the metal separating plate technology is recently and widely developed. However, because the metal separating plate exposes to high temperature and oxidation atmosphere, the insulating oxide scale is formed on the surface of the metal separating plate and interrupts electronic connection between unit cells, so that the performance of fuel cell is greatly decreased. Especially, when the channel is manufactured through the mechanical process on the metal separating plate, a lot of costs and times are consumed as the ceramic separating plate.

Thus, in order to secure the performance of the solid oxide fuel cell stack, the channel should be well formed so that the fuel and air (oxygen) may be uniformly distributed in the entire of the fuel cell located inside the stack.

The separating plate of the fuel cell stack may be counter flow, co-flow, cross-flow and so on according to the position of the manifold and the channel. In the separating plate with the cross-flow channel, supplied gas from the manifold is distributed along a main channel in the horizontal direction and a micro channel in the vertical direction to the direction of the main channel. In the other side of the separating plate, the main channel is formed in the vertical direction so that the two gases flow in vertically crossed direction finally.

In the separating plate, which has a cross-flow type channel in the conventional solid oxide fuel cell stack, gas supplied to the main channel is provided to the micro channel and is used for electrochemical reaction. After the reaction, the gas is combined at the exit ends of the channel and vented to the outside via an outflow manifold. It is not easy to supply gas uniformly to each micro-channel. Once the gas is distributed inside the micro channel from the main channel, re-distribution is not conducted until the discharge.

Additionally, as well as it is difficult to form the micro channel of the separating plate accurately, workability problems were declining because of lots of time-consumption.

SUMMARY OF THE INVENTION

The present invention provides a separating plate of solid oxide fuel cell stack supplying fuel and air to fuel channel and air channel uniformly.

The present invention also provides a separating plate of solid oxide fuel cell stack improving mechanical workability by forming fuel channel and air channel accurately.

In one aspect of the present invention, a separating plate of solid oxide fuel cell stack includes a substrate, upper and lower micro channel plates and upper and lower sealing guides. The substrate includes a fuel inflow/outflow manifold and an air inflow/outflow manifold disposed opposing to each other in a diagonal direction, a fuel channel having a pair of horizontal channels and an inclined channel connecting ends of the horizontal channels so as to connect the fuel inflow/outflow manifold, and an air channel having a pair of vertical channels and an inclined channel connecting ends of the vertical channels so as to connect the air inflow/outflow manifold. The upper and lower micro channel plates are attached to upper and lower parts of the substrate and includes a plurality of micro channels so as to distribute uniformly fuel flowing in the fuel channel and air flowing in the air channel. The upper and lower sealing guides keep a constant gap with the upper and lower micro channel plates and are attached to the upper and lower parts of the substrate.

The fuel channel of the substrate may be formed as Z-shape, and the air channel may be formed as N-shape, which is rotated at 90° with respect to the fuel channel.

The fuel channel of the substrate may be formed as counter Z-shape, and the air channel may be formed as counter N-shape, which is rotated at 90° with respect to the fuel channel.

The fuel channel and the air channel respectively may include a rounding part in a connecting part between the horizontal channel and the inclined channel and between the vertical channel and the inclined channel.

A connecting part between the fuel inflow/outflow manifold and the fuel channel may be connected parallel or at a predetermined angle. A connecting part between the air inflow/outflow manifold and the air channel may be connected parallel or at a predetermined angle.

A cover part may be disposed at end of the fuel channel and the air channel.

The upper micro channel plate includes boundary bars forming the micro channel and a first channel extending part, which is formed along parts corresponding to the horizontal channel of the fuel channel and by partially opening the one part of the boundary bars.

The first channel extending part of the upper micro channel plate may cross the micro channels of the micro channel plate.

The upper micro channel plate includes a second channel extending part, which is formed along parts where the horizontal channel of the fuel channel is not formed and along extension of the first channel extending part of the upper micro channel plate and by entirely opening the one part of the boundary bars.

The lower micro channel plate includes boundary bars forming the micro channel and a first channel extending part, which is formed along parts corresponding to the vertical channel of the air channel and by partially opening the one part of the boundary bars.

The first channel extending part of the lower micro channel plate crosses the micro channels of the micro channel plate.

The lower micro channel plate includes a second channel extending part, which is formed along parts where the vertical channel of the air channel is not formed and along extension of the first channel extending part of the lower micro channel plate and by entirely opening the one parts of the boundary bars.

The upper and lower micro channel plate and the upper and lower sealing guides may be formed separately and are attached to the upper and lower parts of the substrate.

According to a solid oxide fuel cell stack of the present invention, a fuel channel of a Z-shape structure flowing fuel in diagonal directions and a micro channel plate distribute fuel uniformly. An air channel of a N-shape structure flowing air in diagonal directions and a micro channel plate distribute air uniformly. Pressure difference in the gas channels is decreased by the first and second channel extending parts of the micro channel plate increasing cross-section areas, so that the fuel and the air are distributed entirely and uniformly, thereby the stack performance is improved.

Moreover, the separating plate is manufactured easily by assembling the micro channel plate and the sealing guide to the substrate having the fuel channel and the air channel. The time and costs for manufacturing the separating plate is reduced.

BRIEF DESCRIPTION OF THE DRAWINGS

The above and other advantages of the present invention will become readily apparent by reference to the following detailed description when considered in conjunction with the accompanying drawings wherein.

DESCRIPTION OF THE EMBODIMENTS

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. In the drawings, the size and relative sizes of layers and regions may be exaggerated for clarity.

Hereinafter, the present invention will be described in detail with reference to the accompanying drawings.

Figure 1:
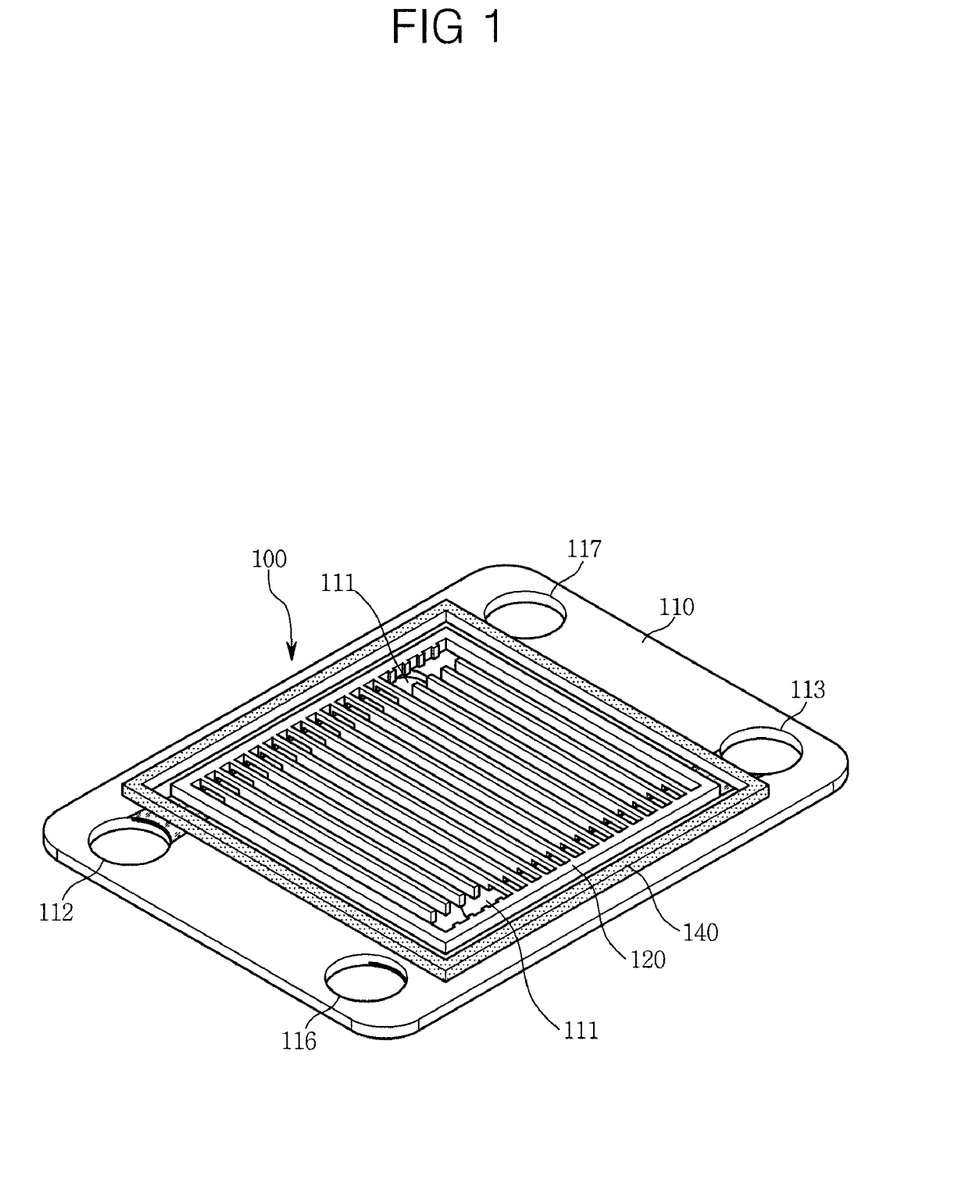
FIG. 1 is a perspective view illustrating a separating plate of solid oxide fuel cell stack in accordance with an embodiment of the present invention.
Figure 2:
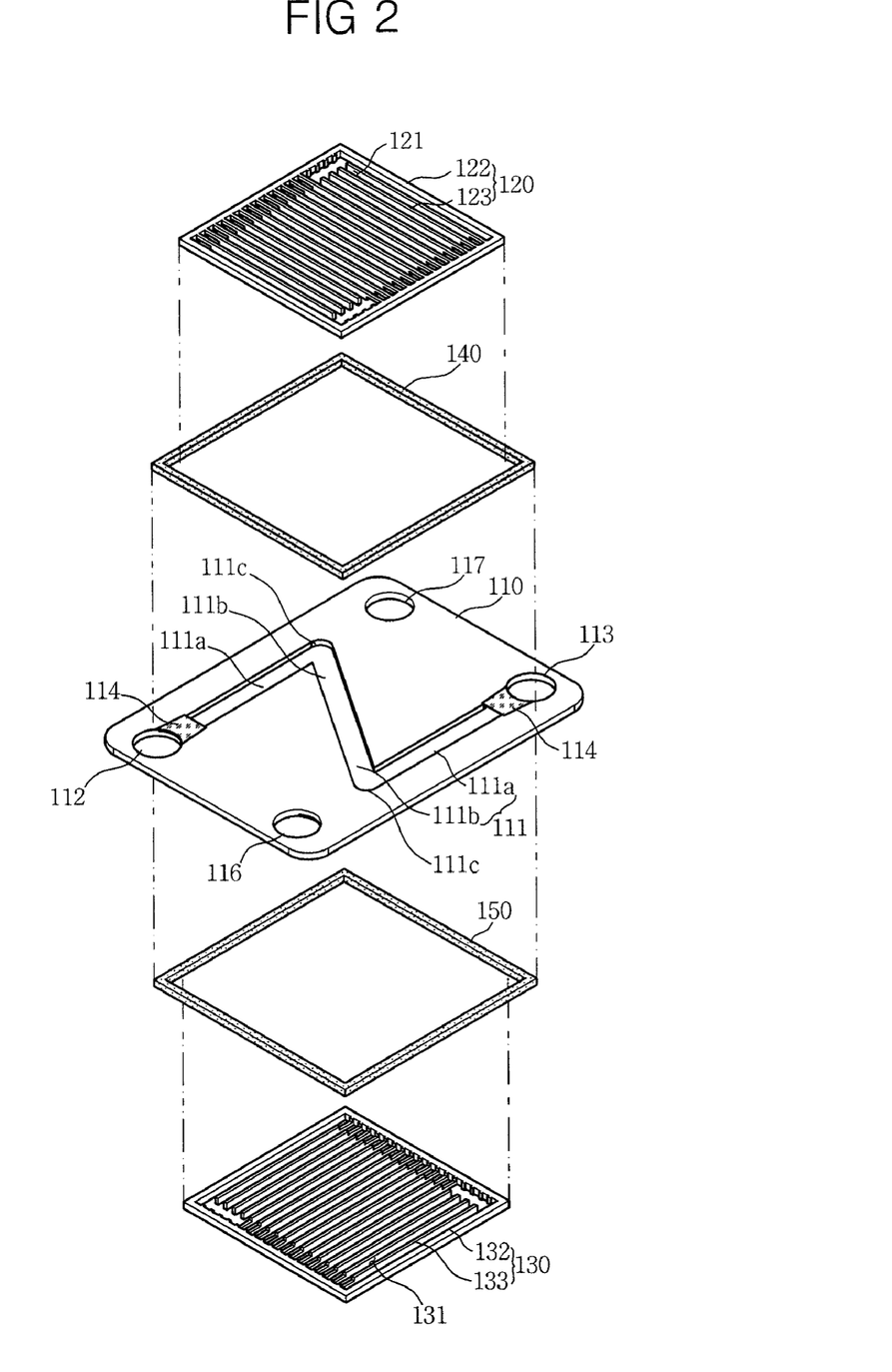
FIG. 2 is an exploded perspective view illustrating the separating plate of solid oxide fuel cell stack in FIG. 1.

FIG. 1 is a perspective view illustrating a separating plate of solid oxide fuel cell stack in accordance with an embodiment of the present invention. FIG. 2 is an exploded perspective view illustrating the separating plate of solid oxide fuel cell stack in FIG. 1.

The separating plate 100 of the solid oxide fuel cell stack of the present invention as illustrated in FIGS. 1 and 2, includes a substrate 110, upper and lower micro channel plate 120, 130 attached to upper and lower parts of the substrate 110 and having micro channels 121, 131, and sealing guides 140, 150 attached to the upper and lower parts of the substrate 110.

As illustrated in FIG. 2, the substrate 110 includes a fuel channel 111 on an upper surface, and fuel inflow/outflow manifold 112, 113 on an end of the fuel channel 111. The substrate 110 includes an air channel 115 on a lower surface, and air inflow/outflow manifold 116, 117 on an end of the air channel 115. The fuel channel 111 and the air channel 115 are formed to be crossed to each other as illustrated in FIG. 3.

The fuel channel 111 as illustrated in FIG. 2, includes one pair of horizontal channel 111a formed on the substrate 110 and an inclined channel 111b to connect an end of the horizontal channel 111a.

Figure 3:
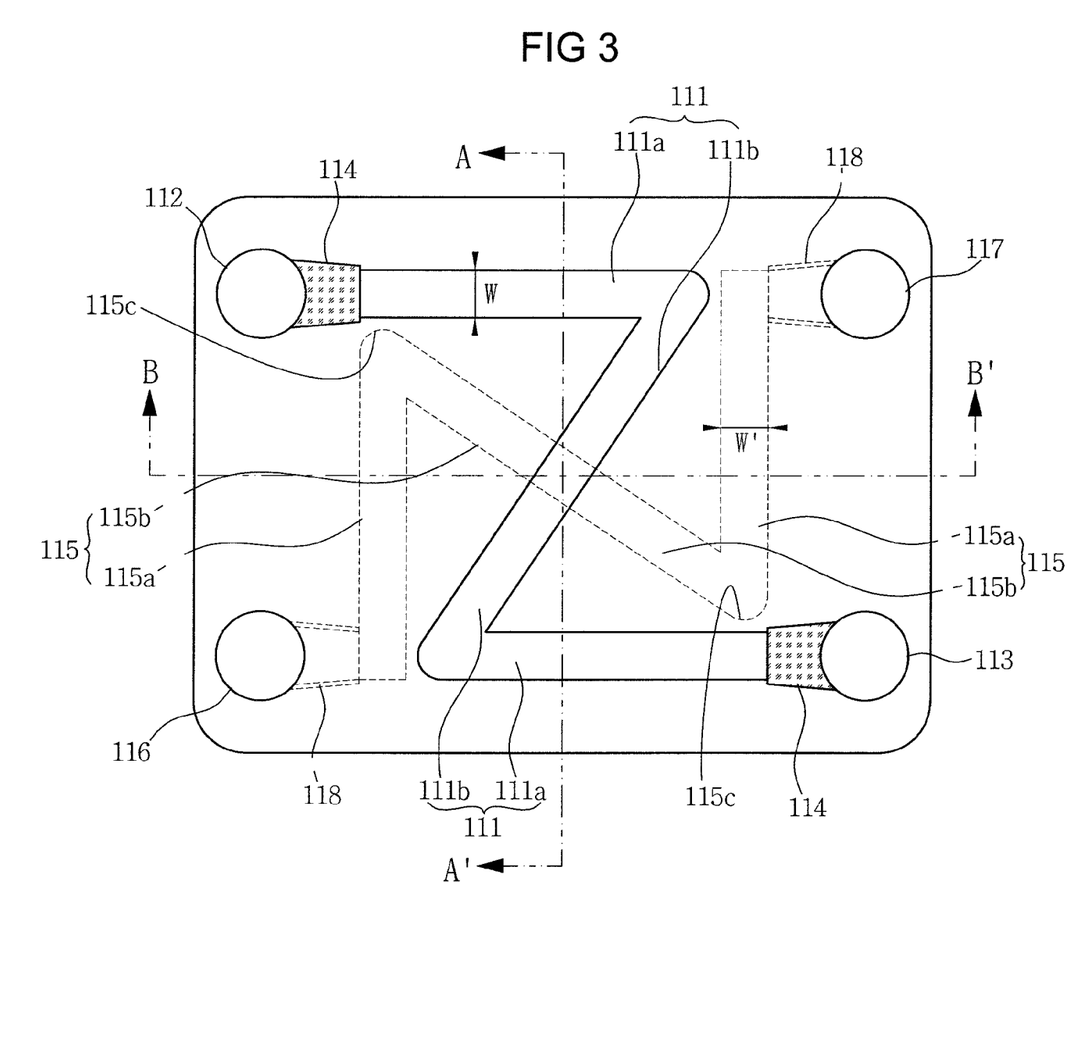
FIG. 3 is a plan view illustrating a substrate of the separating plate in accordance with an embodiment of the present invention.
Figure 4:
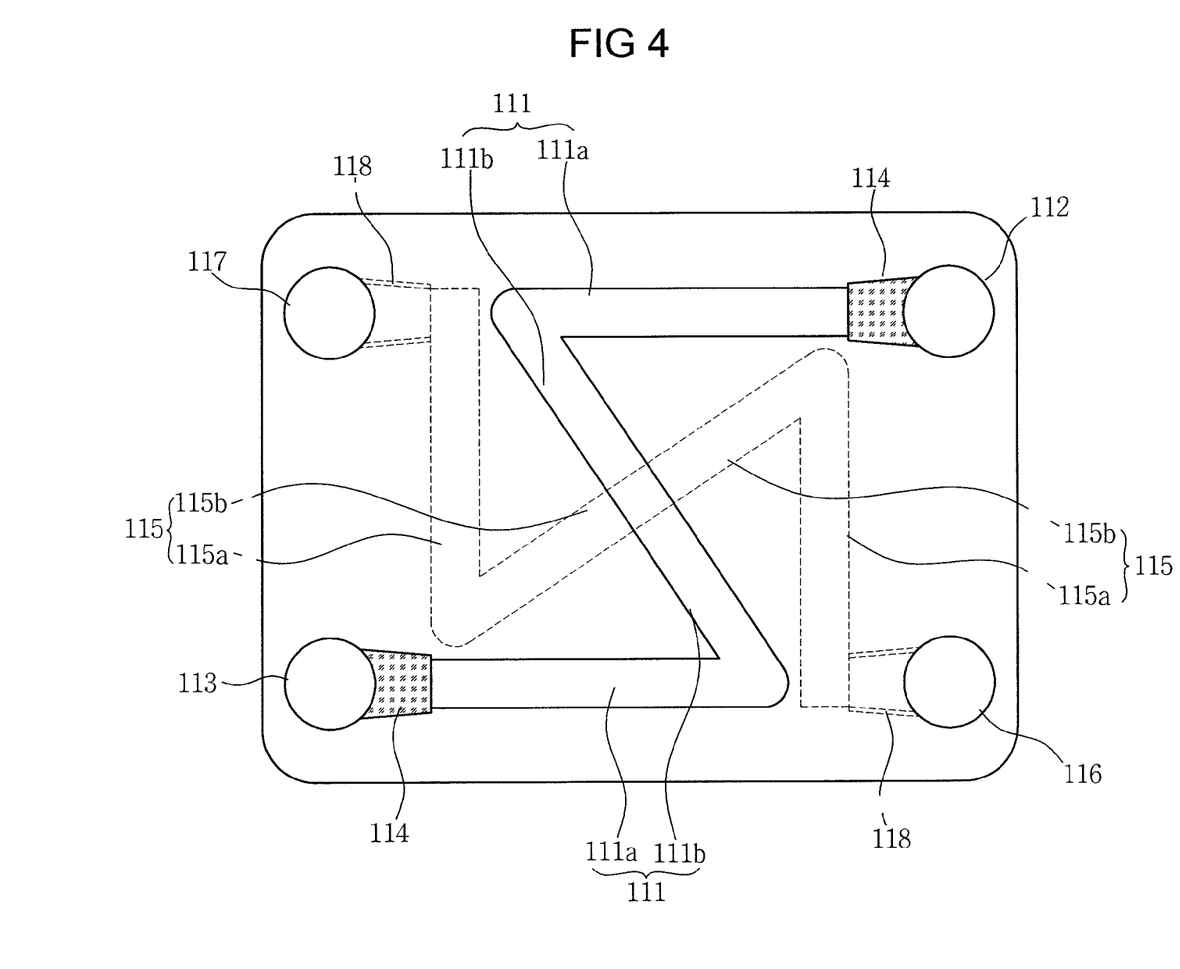
FIG. 4 is a plan view illustrating a substrate of the separating plate in accordance with another embodiment of the present invention.

The fuel channel 111 as illustrated in FIGS. 3 and 4, is formed as a Z-shape or a reverse Z-shape on the upper surface of the substrate 110. When the fuel channel 111 is formed as a Z-shape, the fuel inflow manifold 112 is formed at a left upper part of the substrate 110 as illustrated in FIG. 3, and the fuel outflow manifold 113 is formed at a right lower part of the substrate 110.

In contrast, when the fuel channel 111 is formed as counter Z-shape, the fuel inflow manifold 112 is formed at an upper right corner of the substrate 110, and the fuel outflow manifold 113 is formed at a bottom left corner of the substrate 110.

The fuel inflowing from the fuel inflow manifold 112 is distributed primarily in the micro channel 121 of the micro channel plate 120 during flowing along the horizontal channel 111a, and is redistributed secondary during flowing along the diagonal channel 111b.

The fuel channel 111 includes a rounding part 111c having a certain radius at a connecting part between the horizontal channel 111a and the inclined channel 111b. The rounding part 111c reduces the pressure loss and ensures fuels to be supplied smoothly at a connecting part between the horizontal channel 111a and the inclined channel 111b.

At the ends of the fuel channel 111, cover parts 114 is disposed, and parts of the cover parts 114 connecting with the fuel inflow/outflow manifold 112, 113 are formed parallel. The connecting part of the fuel channel 111 may be formed to have a constant angle or a bending part depending on the size and the shape of the separating plate 100.

The cover part 114 seals the connecting part between the fuel inflow/outflow manifolds (112,113) and fuel channels (111a) out of the sealing guide (140). The air channel 115 as illustrated in FIG. 3, includes a pair of vertical channels 115a formed on the bottom of the substrate 110 and an inclined channel 115b connecting to an end of the vertical channel 115a.

That air channel 115 as illustrated in FIGS. 3 and 4, is formed as an N-shape or a counter N-shape on the bottom of the substrate 110. When the air channel 115 is formed as an N-shape, the air inflow manifold 116 is formed at left bottom corner with respect to FIG. 3, and the air outflow manifold 117 is formed at right top corner. In contrast, when the air channel 115 is formed as a counter N-shape, the air inflow manifold 116 is formed at right bottom with respect to FIG. 4, and the air outflow manifold 117 is formed at left top corner. The air channel 115 is formed to be rotated at 90° with respect to the fuel channel 111.

The air channel 115 includes a rounding part 115c having a certain radius at a connecting part between the vertically channel 115a and the inclined channel 115b. The rounding part 115c reduces the pressure loss at the connecting part between the vertical channel 115a and the inclined channel 115b.

At the ends of the air channel 115, cover parts 118 is disposed, and parts of the cover parts 118 connecting with the air inflow/outflow manifold 116, 117 are formed to be bended at 90°. The connecting part of the air channel 115 may be formed to have a constant angle or a flat shape depending on the size and the shape of the separating plate 100.

Figure 5A:
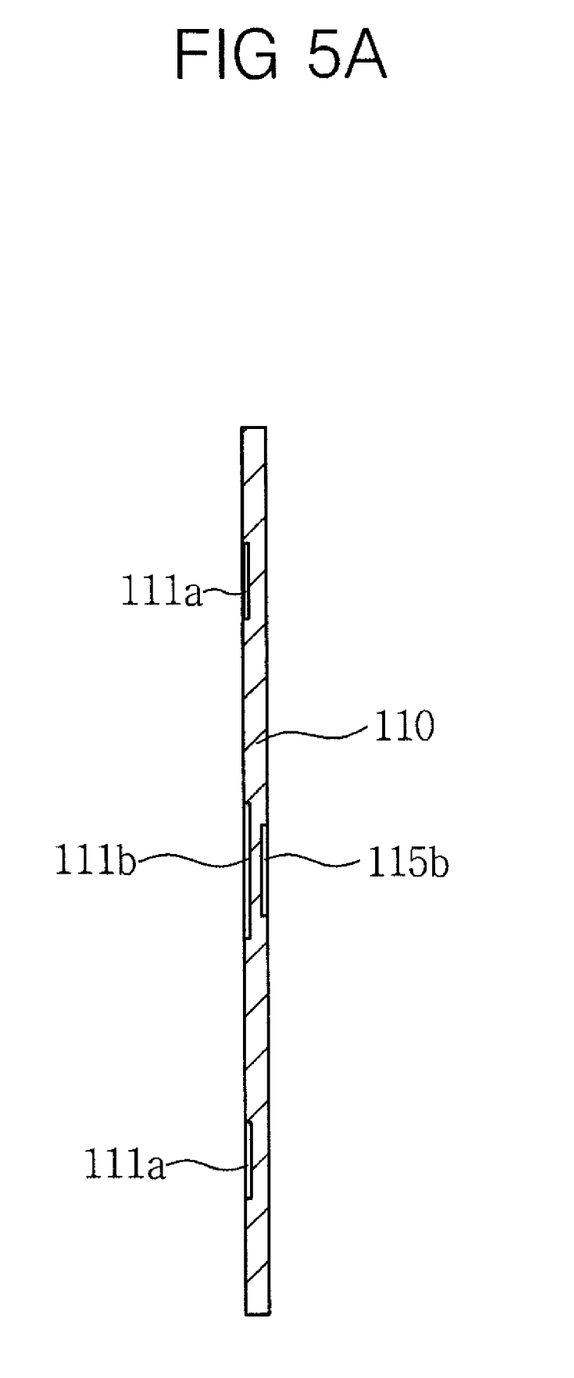
FIGS. 5A and 5B are cross-sectional views taken along the lines of A-A' and B-B' in FIG. 3.
Figure 5B:
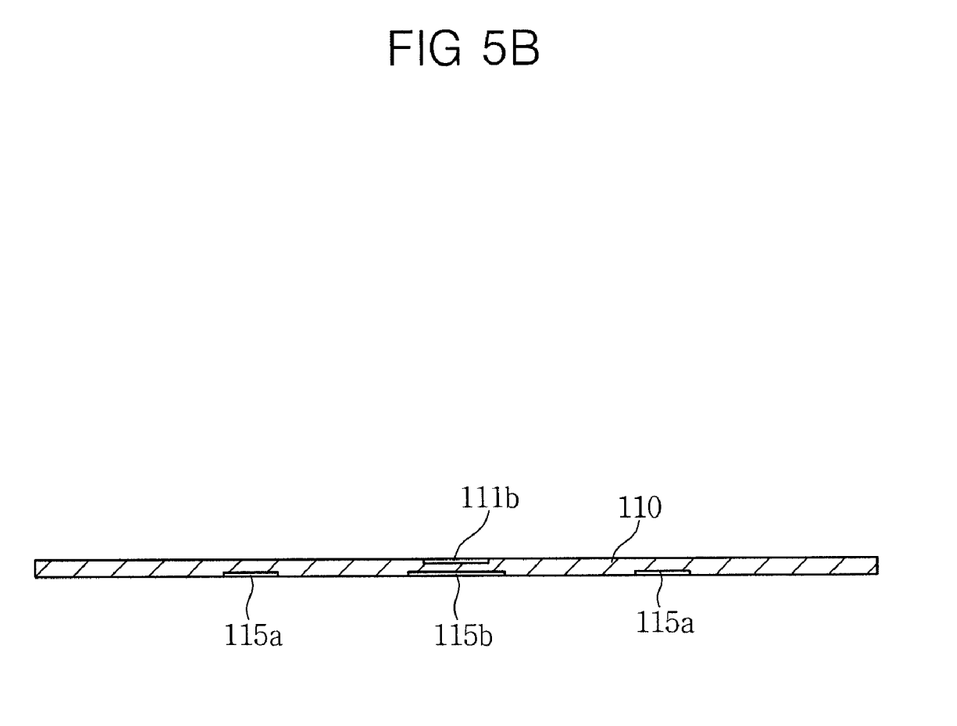

In the air channel 115 as illustrated in FIGS. 5A and 5B, the inclined channel 115b is crossed the inclined channel 111b of the fuel channel 111.

The fuel channel 111 may be formed at the bottom of the substrate 110, and the air channel 115 may be formed at upper surface of the substrate 110. Moreover, the fuel channel 111 may be formed as an N-shape or a counter N-shape, and the air channel 115 may be formed as a Z-shape or a counter Z-shape.

Figure 6A:
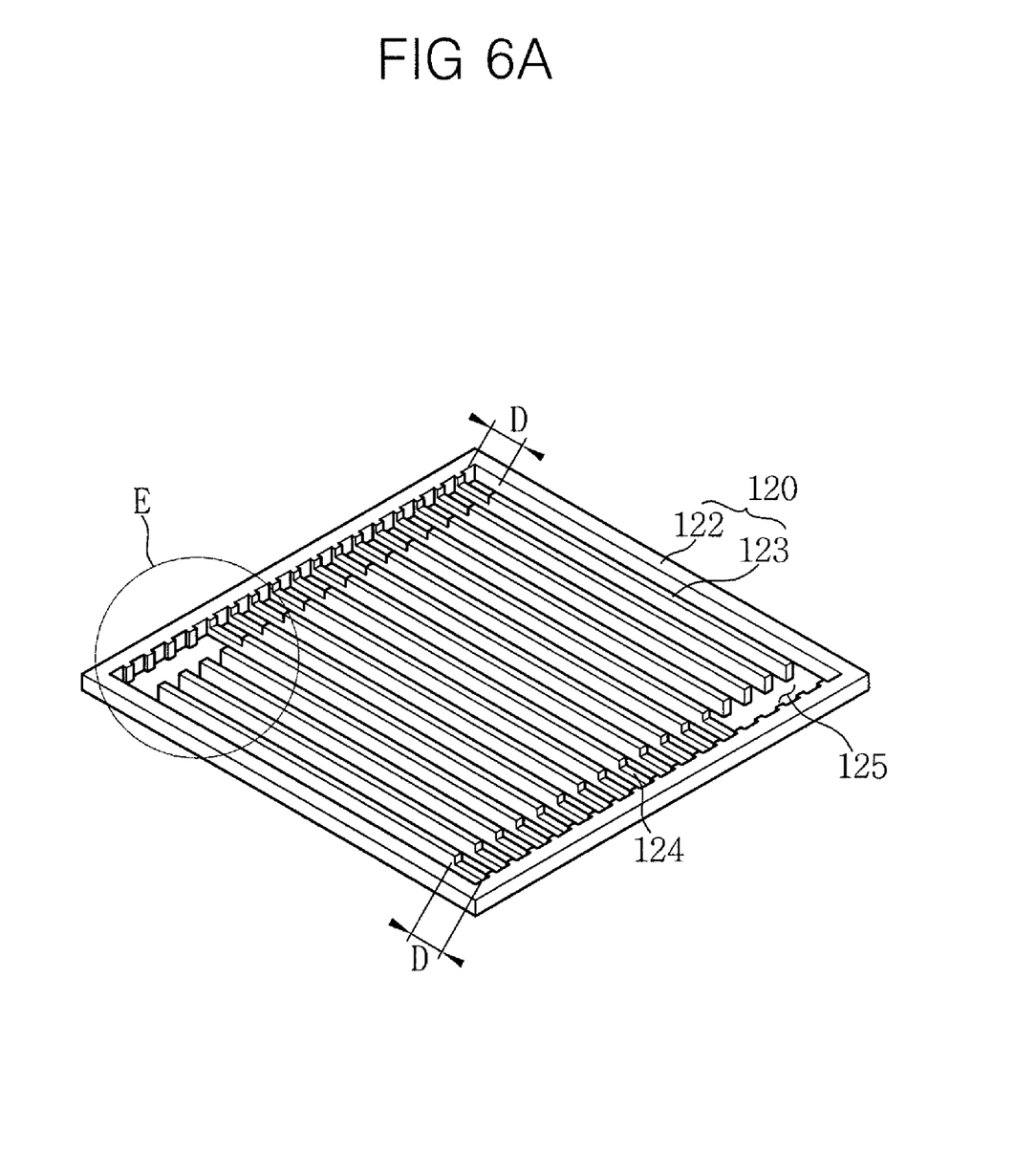
FIG. 6A is a perspective view illustrating a first micro channel plate of the separating plate in accordance with an embodiment of the present invention.
Figure 6B:
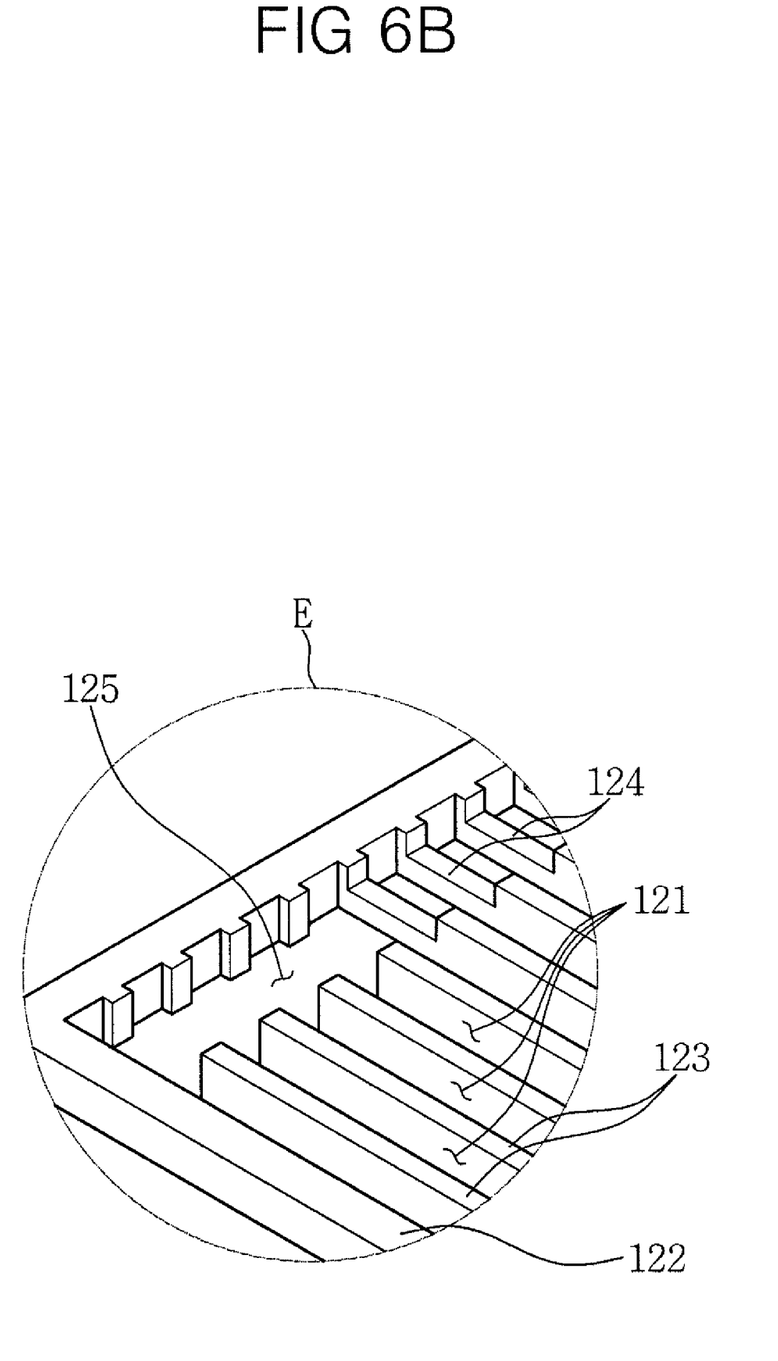
FIG. 6B is a enlarged perspective view of E in FIG. 6A.

The upper micro channel part 120 as illustrated in FIG. 2, a plurality of micro channels 121 is formed to be attached to the upper part of the substrate 110. The upper micro channel plate 120 uniformly distributes fuels supplied from the fuel inflow manifold 112 via the micro channels 121. The upper micro channel plate 120 as illustrated in FIGS. 6A and 6B, includes an outline part 122 formed as rectangular and a plurality of boundary bars 123 with constant gap inside the outline part 122. The gaps of the boundary bars 123 form the micro channel 121.

The upper micro channel plate 120 includes a first channel extending part 124, which is formed along parts corresponding to the horizontal channel 111a of the fuel channel 111 and by partially opening the one part of the boundary bars 123.

The first channel extending part 124 is formed to be crossed with a forming part of the micro channel 121.

The first channel extending part 124 increases height of the fuel channel 111 so as to increase channel cross-section area. The width D of the first channel extending part 124 as illustrated in FIGS. 6A and 6B may be smaller than or the same with the width W of the fuel channel 111 as illustrated in FIG. 3.

The upper micro channel plate 120 includes a second channel extending part 125, which is formed along the parts where the horizontal channel 111a is not formed and along extension of the first channel extending part 124 of the upper micro channel plate 120 and by entirely opening the one part of the boundary bars 123.

The second channel extending part 125 is opened from an end of the first channel extending part 124 opposing to the rounding part 111c of the fuel channel 111 to a front part of the outline part 122. The second channel extending part 125 increases cross-section areas of the fuel channel so as to decrease pressure difference at which a place is far away from the fuel inflow manifold 112, so that the fuel is distributed uniformly.

The lower micro channel plate 130 as illustrated in FIG. 2, includes a plurality of micro channels 131 attached to the bottom of the substrate 110. The lower micro channel plate 130 distributes uniformly air supplied from the air inflow manifold 115 via the micro channel 131.

Figure 6C:
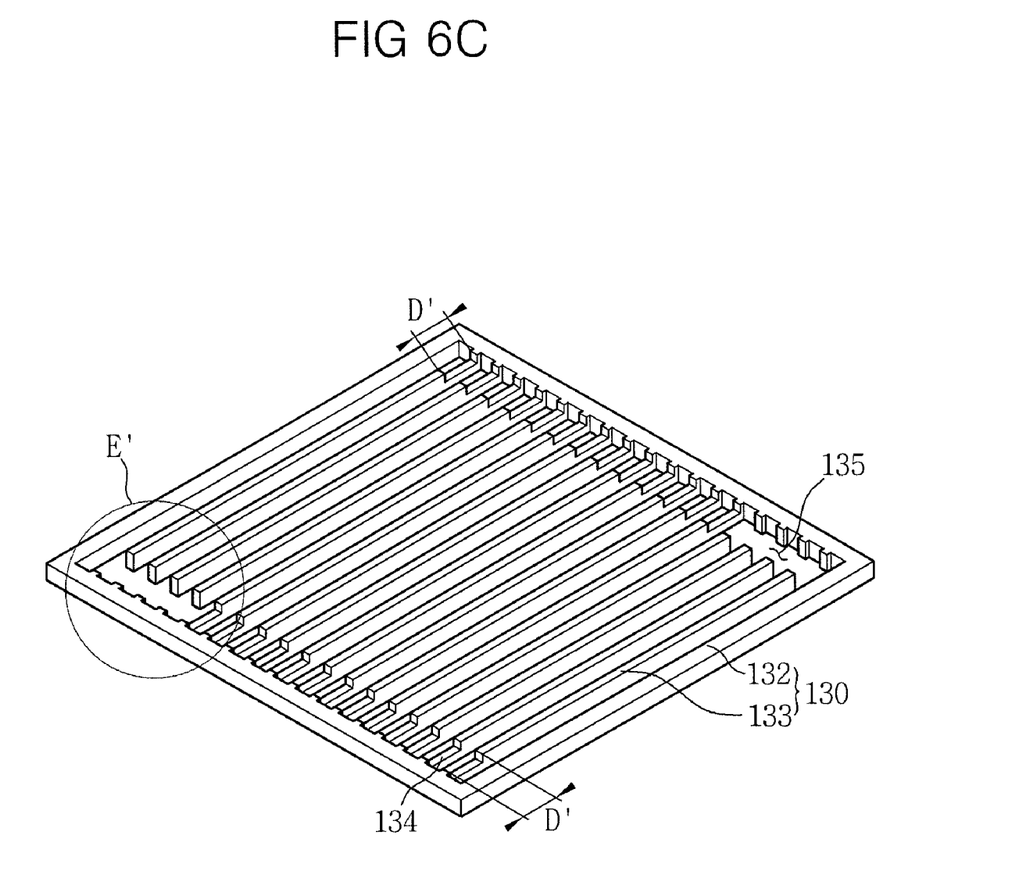
FIG. 6C is a perspective view illustrating a second micro channel plate of the separating plate in accordance with another embodiment of the present invention.
Figure 6D:
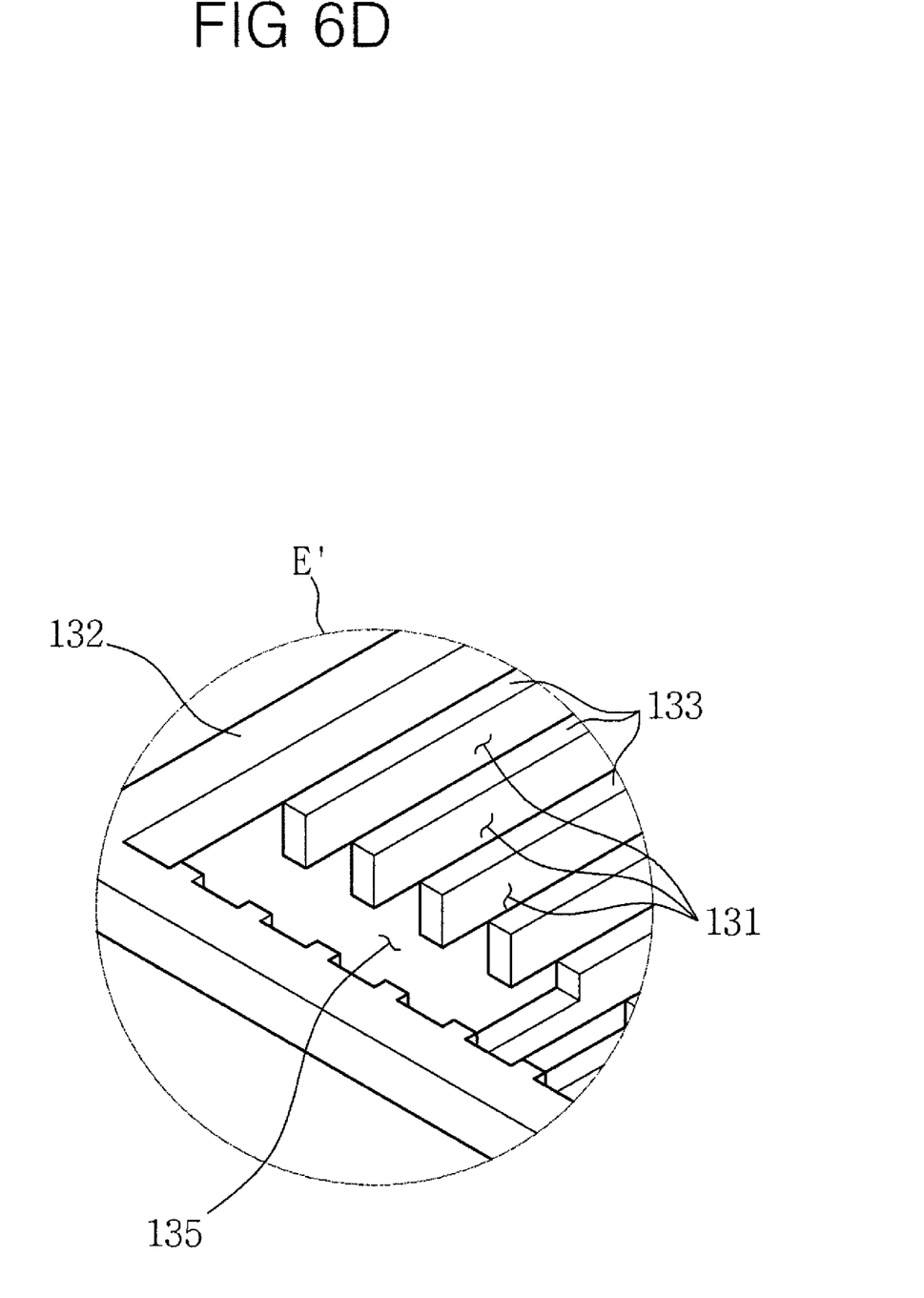
FIG. 6D is an enlarged perspective view of E' in FIG. 6C.

The lower micro channel plate 130 as illustrated in FIGS. 6C and 6D, includes an outline part 132 formed as rectangular and a plurality of boundary bars 133 with constant gap inside the outline part 132. The gaps of the boundary bars 133 form the micro channel 131.

The lower micro channel plate 130 includes a first channel extending part 134, which is formed along parts corresponding to the vertical channel 115a of the air channel 115 and is formed by partially opening the one part of the boundary bars 133.

The first channel extending part 134 is formed to be crossed with a forming part of the micro channel 131.

The first channel extending part 134 increases height of the air channel 115 so as to increase channel cross-section area. The width D' of the first channel extending part 134 as illustrated in FIGS. 6C and 6D may be smaller than or the same with the width W' of the air channel 115 as illustrated in FIG. 3.

The lower micro channel plate 130 includes a second channel extending part 135, which is formed along the parts where the vertical channel 115a is not formed and along extension of the first channel extending part 134 of the lower micro channel plate 130 and by entirely opening the one part of the boundary bars 133.

The second channel extending part 135 is opened from an end of the first channel extending part 134 opposing to the rounding part 115c of the air channel 111 to a front part of the outline part 132. The second channel extending part 135 increases cross-section areas of the fuel channel so as to decrease pressure difference at which a place is far away from the air inflow manifold 116, so that the fuel is distributed uniformly.

The upper and lower sealing guides 140 and 150 are formed square type to be attached to the upper and lower parts of the substrate 110. The upper and lower sealing guides 140 and 150 are formed greater than the upper and lower micro channel plates 120 and 130 with a constant distance to the micro channel plates 120 and 130 to be attached to the upper and lower parts of the substrate 110.

The upper sealing guide 140 prevents the fuel distributed to the substrate 110 by the fuel channel 111 and the upper micro channel plate 120 from leaking outside. The lower sealing guide 150 prevents the air distributed to the substrate 110 by the air channel 115 and the lower micro channel plate 130 from leaking.

According to a solid oxide fuel cell stack of the present invention, a fuel channel of a Z-shape structure flowing fuel in diagonal directions and a upper micro channel plate redistribute fuel uniformly. An air channel of an N-shape structure flowing air in diagonal directions and a lower micro channel plate redistribute air uniformly. Pressure loss due to the fuel channel and air channel is decreased by the first and second channel extending parts increasing cross-section areas, so that the fuel and the air are distributed entirely and uniformly, thereby the stack performance is improved.

Although the exemplary embodiments of the present invention have been described, it is understood that the present invention should not be limited to these exemplary embodiments but various changes and modifications can be made by one ordinary skilled in the art within the spirit and scope of the present invention as hereinafter claimed.

What is claimed is:

1. A separating plate of solid oxide fuel cell stack comprising:
    a substrate including:
        a fuel inflow/outflow manifold and an air inflow/outflow manifold disposed opposing to each other in a diagonal direction;
        a fuel channel having a pair of horizontal channels and an inclined channel connecting ends of the horizontal channels so as to connect the fuel inflow/outflow manifold; and
        an air channel having a pair of vertical channels and an inclined channel connecting ends of the vertical channels so as to connect the air inflow/outflow manifold;
    upper and lower micro channel plates attached to upper and lower parts of the substrate and including a plurality of micro channels so as to distribute uniformly fuel flowing in the fuel channel and air flowing in the air channel; and
    upper and lower sealing guides keeping a constant gap with the upper and lower micro channel plates and attached to the upper and lower parts of the substrate.

2. The separating plate of claim 1,
    wherein the fuel channel of the substrate is formed as Z-shape, and
    the air channel is formed as N-shape, which is rotated at 90° with respect to the fuel channel.

3. The separating plate of claim 1,
    wherein the fuel channel of the substrate is formed as counter Z-shape, and
    the air channel is formed as counter N-shape, which is rotated at 90° with respect to the fuel channel.

4. The separating plate of claim 1,
    wherein the fuel channel and the air channel respectively includes a rounding part in a connecting part between the horizontal channel and the inclined channel and between the vertical channel and the inclined channel.

5. The separating plate of claim 1,
    wherein a connecting part between the fuel inflow/outflow manifold and the fuel channel is connected parallel or at a predetermined angle.

6. The separating plate of claim 1,
    wherein a connecting part between the air inflow/outflow manifold and the air channel is connected parallel or at a predetermined angle.

7. The separating plate of claim 1,
    wherein a cover part is disposed at the connecting part between the inflow/outflow manifolds and the end of the fuel channel and air channel.

8. The separating plate of claim 1,
    wherein the upper micro channel plate includes boundary bars forming the micro channel and a first channel extending part, which is formed along parts corresponding to the horizontal channel of the fuel channel and by partially opening the one part of the boundary bars.

9. The separating plate of claim 8,
    wherein the first channel extending part of the upper micro channel plate crosses the micro channels of the micro channel plate.

10. The separating plate of claim 8,
    wherein the upper micro channel plate includes a second channel extending part, which is formed along parts where the horizontal channel of the fuel channel is not formed and along extension of the first channel extending part of the upper micro channel plate and by entirely opening the one part of the boundary bars.

11. The separating plate of claim 1,
    wherein the lower micro channel plate includes boundary bars forming the micro channel and a first channel extending part, which is formed along parts corresponding to the vertical channel of the air channel and by partially opening the one part of the boundary bars.

12. The separating plate of claim 11,
    wherein the first channel extending part of the lower micro channel plate crosses the micro channels of the micro channel plate.

13. The separating plate of claim 11,
    wherein the lower micro channel plate includes a second channel extending part, which is formed along parts where the vertical channel of the air channel is not formed and along extension of the first channel extending part of the lower micro channel plate and by entirely opening the one parts of the boundary bars.

14. The separating plate of claim 1,
    wherein the upper and lower micro channel plate and the upper and lower sealing guides are formed separately and are attached to the upper and lower parts of the substrate.

* * * * *